US012693275B2

(12) United States Patent　　　(10) Patent No.: US 12,693,275 B2
　　Kawase　　　　　　　　　　　　　　(45) Date of Patent: Jul. 28, 2026

(54) METHOD AND PROGRAM FOR ASSISTING DEVELOPMENT OF ANALYSIS PROCEDURE

(71) Applicant: SHIMADZU CORPORATION, Kyoto (JP)

(72) Inventor: Tomohiro Kawase, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 502 days.

(21) Appl. No.: 17/739,131

(22) Filed: May 8, 2022

(65) Prior Publication Data

US 2023/0094950 A1　　Mar. 30, 2023

(30) Foreign Application Priority Data

Sep. 29, 2021　　(JP) ................................. 2021-158880

(51) Int. Cl.
　　*G01N 30/86*　　　(2006.01)
　　*G01N 30/02*　　　(2006.01)
(52) U.S. Cl.
　　CPC ..... *G01N 30/8693* (2013.01); *G01N 30/8631* (2013.01); *G01N 2030/027* (2013.01)
(58) Field of Classification Search
　　CPC ........... G01N 30/8693; G01N 30/8631; G01N 2030/027; G01N 30/8662
　　See application file for complete search history.

(56) References Cited

U.S. PATENT DOCUMENTS 9,729,639 B2 * 8/2017 Sustaeta ................ H04L 67/125
10,254,258 B2 * 4/2019 Yamaguchi ........... G01N 30/88
(Continued)

FOREIGN PATENT DOCUMENTS

EP　　　　3193174 A1 * 7/2017　.............. C12Q 1/04
JP　　　H01250060 A * 10/1989
(Continued)

OTHER PUBLICATIONS

JP-H01250060-A_translated (Year: 1989).*
(Continued)

*Primary Examiner* — Yoshihisa Ishizuka
(74) *Attorney, Agent, or Firm* — Renner, Otto, Boisselle & Sklar, LLP

(57)　　　　　ABSTRACT

A program for assisting in determining a combination of parameter values of analysis conditions suitable for an intended analysis, makes a computer operate as: a graph-displaying section which displays, on a screen, a graph created based on data collected with a chromatograph device, to show a relationship between the parameter values and an analysis result obtained with the chromatograph device or a result of analytical processing based on the analysis result; an input-receiving section which receives a user's input of a constraint condition which specifies the upper/lower limit or range of a numerical value representing the analysis result or analytical-processing result; a search-conducting section which conducts a search for a combination of the parameter values which yields the analysis result or analytical-processing result in which the numerical value satisfies a predetermined search condition under the constraint condition; and a search-result-displaying section which displays a search result on the graph.

14 Claims, 6 Drawing Sheets

(56)             References Cited

U.S. PATENT DOCUMENTS

| | | | | |
|---|---|---|---|---|
| 2010/0250147 A1* | 9/2010 | Verseput | ................. | G06F 30/00 |
| | | | | 702/32 |
| 2018/0136175 A1* | 5/2018 | Nakashima | ........ | G01N 30/8644 |
| 2019/0353627 A1* | 11/2019 | Kurotobi | ............ | G01N 30/6034 |
| 2022/0238318 A1* | 7/2022 | Ishikawa | ............. | H01J 49/0031 |

FOREIGN PATENT DOCUMENTS

| | | | | | |
|---|---|---|---|---|---|
| WO | WO-2018167986 | A1 * | 9/2018 | .......... | G01N 30/468 |
| WO | 2021/024396 | A1 | 2/2021 | | |

OTHER PUBLICATIONS

WO-2018167986-A1_translated (Year: 2018).*
EP-3193174-A1_translated (Year: 2017).*
Office Action dated Apr. 9, 2024 issued for corresponding Japanese Patent Application No. 2021-158880, with English machine translation.
Fukatsu and Agata, "Bunsekihou Kaihatsu Ni Okeru Quality by Design No Jissen (Implementation of Quality by Design in Development of Analysis Procedure)", Farumashia, vol. 53, No. 5, 2017, pp. 440-444 (cited in specification).
"ChromSword AutoRobust", ChromSword Japan Co., Ltd., [online], [accessed on Sep. 8, 2021], the Internet <URL: https://www.chromsword.co.jp/product/product02.html> (cited in specification).
Asahi et al., "Analytical Quality by Design for the Analysis of Formoterol, Budesonide, and Its Related Compounds", The 140th Annual Meeting of the Pharmaceutical Society of Japan (Kyoto), Mar. 25-28, 2020 (cited in specification).
"Bunrido No. Hanashi—Sono 1 (A Talk about Resolution-Part 1)", Shimadzu Corporation, [online], [accessed on Feb. 24, 2022], the Internet <URL: https://www.an.shimadzu.co.jp/hplc/support/lib/lctalk/81/81intro.htm> (cited in specification).
Second Office Action dated Feb. 18, 2025 issued for the corresponding Chinese Patent Application No. 202210485085.1, with machine translation.
First Office Action dated Sep. 24, 2024 issued for the corresponding Chinese Patent Application No. 202210485085.1.
Decision of Rejection dated Jun. 17, 2025 issued for corresponding Chinese Patent Application No. 202210485085.1, with machine translation.

* cited by examiner

X-Y Axes Setting

| X | Y | Factors | Value | |
|---|---|---|---|---|
| ◉ | ○ | Mobile phase B Cb(%) | | 30 |
| ○ | ◉ | Period of time t2 (min) | | 48 |

Response Setting

| Display | Response | Value | Lower Limit | Upper Limit |
|---------|----------|-------|-------------|-------------|
| ☑ | Lowest resolution | 8.583 | 7 | 9 |
| ☐ | Separated peaks | 5 | 5 | 5 |
| ☐ | Evaluation value | 125 | 112.198 | 125 |

1220  1223  1221  122  1222

Optimum Condition Search Setting

20

Response:    [ Lowest resolution ∨ ]    200

○ Search for an optimum point    201

◉ Search for a point that satisfies robustness reqirements

| Factors | Allowable Value |
|---------|-----------------|
| Mobile phase B Cb (%) | 3 |
| Period of time t2 (min) | 3 |
| | |

202

203

[ Run ]    [ Cancel ]

METHOD AND PROGRAM FOR ASSISTING DEVELOPMENT OF ANALYSIS PROCEDURE

TECHNICAL FIELD

The present invention relates to a method for assisting the development of an analysis procedure using various analyzing apparatuses, and a computer program used for the assistance. In particular, it relates to a method and program for assisting the development of an analysis procedure in a chromatographic analysis.

BACKGROUND ART

In the development and production of drugs, the evaluation and control of product qualities is extremely important. In order to guarantee the evaluation and control, analysis procedures must have a sufficient degree of robustness. In recent years, a technique based on the concept of AQbD (Analytical Quality by Design, which may also be simply called the Quality by Design, or QbD) has been drawing attention for the development of highly robust analysis procedures (for example, see Non Patent Literature 1). Computer software applications for assisting the development of an analysis procedure based on AQbD have also been offered (for example, see Non Patent Literatures 2 and 3).

For example, consider an analysis using a liquid chromatograph (LC). An LC analysis has various analysis conditions, such as the flow rate (flow velocity) of the mobile phase, temporal change (time program) of the mixture ratio of the mobile phases in the gradient elution, temperature of the column oven, and amount of sample injection. Optimizing an analysis procedure means finding a combination of optimum parameter values related to those various analysis conditions. Normally, an optimum analysis procedure in an LC analysis is an analysis procedure by which the peaks originating from the largest possible number of different compounds can be separated from each other when a sample containing a plurality of kinds compounds is analyzed, although there are also cases in which an analysis procedure with a high level of resolution for one or more specific compounds is required.

For an approach according to AQbD, it is ideal to perform experimental analyses for all possible combinations of the parameter values in various analysis conditions and compare the analysis results with each other to determine an optimum analysis procedure. However, due to the limitation of time, labor, cost or other factors, it is normally impractical to perform experiments for all possible combinations of the parameter values. Therefore, it is common to determine an approximate curve or surface by regression analysis based on the results obtained for a limited number of combinations of the parameter values, and search for optimum (or practically, nearly optimum) conditions on the approximate curve or surface.

CITATION LIST

Non Patent Literature

Non Patent Literature 1: Fukatsu and Agata, "Bunsekihou Kaihatsu Ni Okeru Quality by Design No Jissen (Implementation of Quality by Design in Development of Analysis Procedure)", Farumashia, Vol. 53, No. 5, 2017, pp.440-444

Non Patent Literature 2: "ChromSword AutoRobust", ChromSword Japan Co., Ltd., [online], [accessed on Sep. 14, 2021], the Internet
Non Patent Literature 3: Asahi et al., "Analytical Quality by Design for the Analysis of Formoterol, Budesonide, and Its Related Compounds", The 140th Annual Meeting of the Pharmaceutical Society of Japan (Kyoto), Mar. 25-28, 2020
Non Patent Literature 4: "Bunrido No Hanashi—Sono 1 (A Talk about Resolution—Part 1)", Shimadzu Corporation, [online], [accessed on Sep. 14, 2021], the Internet

SUMMARY OF INVENTION

Technical Problem

Conventionally offered software applications for assisting the development of an analysis procedure display, on a screen, a contour graph, heat map or similar graph which shows the relationship between the parameter values of a plurality of analysis conditions and an analytical-processing result value, such as a signal intensity value or resolution, created by an prediction calculation, such as a regression analysis. This type of graph is called a "design space". By viewing this design space, the user can understand the relationship between the parameter values of the plurality of analysis conditions and the analysis result value. Some of those software applications for assisting the development of an analysis procedure have the function of displaying a predicted chromatogram for a specific combination of the parameter values represented by a point on the design space.

However, in the conventional software applications for assisting the development of an analysis procedure, the task of finding a combination of the parameter values which are considered to be most appropriate on the design space must be performed by users themselves through trial and error. In particular, finding the combination of appropriate parameter values under the condition that the analysis procedure must have a high level of robustness is a considerably complex and time-consuming task. Additionally, the degree of appropriateness of this type of task depends on the experience, skill, ability and other personal factors of the individual who performs the task, and therefore, will inevitably vary between individuals.

The present invention has been developed in view of such a problem. Its objective is to provide a method for assisting the development of an analysis procedure, and a computer program for the same method, which can reduce the workload of the user in developing an analysis procedure and can also determine appropriate analysis conditions without relying on the ability, experience or other personal factors of the individual who performs the task.

Solution to Problem

One mode of the method for assisting the development of an analysis procedure according to the present invention developed for solving the previously described problem is a method for assisting the development of an analysis procedure, in which an analysis result obtained with a chromatograph device is used to assist the task of determining a combination of respective parameter values of a plurality of analysis conditions suitable for an intended analysis, the method including:

a graph-displaying step for displaying, on a screen of a display section, a graph created based on data collected with a chromatograph device, the graph showing a relationship between the parameter values of the plurality of analysis conditions and an analysis result obtained with the chromatograph device or a result of analytical processing based on the analysis result;

an input-receiving step for receiving an input, by a user, of a constraint condition which specifies the upper limit, the lower limit or the range of a numerical value representing the analysis result or the result of the analytical processing;

a search-conducting step for conducting a search for a combination of the parameter values of the plurality of analysis conditions, the combination yielding the analysis result or the result of the analytical processing in which the numerical value satisfies a previously determined search condition under the received constraint condition; and a search-result-displaying step for displaying, on the graph, a search result obtained by the search-conducting step.

One mode of the program for assisting the development of an analysis procedure according to the present invention developed for solving the previously described problem is a program for assisting the development of an analysis procedure, in which an analysis result obtained with a chromatograph device is used to assist the task of determining a combination of respective parameter values of a plurality of analysis conditions suitable for an intended analysis, the program configured to make a computer operate as:

a graph-displaying functional section configured to display, on a screen of a display section, a graph created based on data collected with a chromatograph device, the graph showing a relationship between the parameter values of the plurality of analysis conditions and an analysis result obtained with the chromatograph device or a result of analytical processing based on the analysis result;

an input-receiving functional section configured to receive an input, by a user, of a constraint condition which specifies the upper limit, the lower limit or the range of a numerical value representing the analysis result or the result of the analytical processing;

a search-conducting functional section configured to conduct a search for a combination of the parameter values of the plurality of analysis conditions, the combination yielding the analysis result or the result of the analytical processing in which the numerical value satisfies a previously determined search condition under the received constraint condition; and a search-result-displaying functional section configured to display, on the graph, a search result obtained by the search-conducting functional section.

Advantageous Effects of Invention

According to the previously described modes of the present invention, the user only needs to specify the range, upper limit or lower limit of a numerical value representing an analysis result or a result of analytical processing which the user considers to be appropriate. Based on the input by the user, analysis conditions which are the most appropriate or considerably close to the most appropriate are presented to the user. This reduces the workload of the user in developing an analysis procedure for a chromatographic analysis, such as the liquid chromatography or gas chromatography. Appropriate analysis conditions can be efficiently determined without relying on the ability, experience, skill or other personal factors of the individual who performs the task.

According to the previously described modes of the present invention, the result of the automatic search is displayed on a graph, which allows the user to visually recognize, for example, whether or not the search result is a local optimum solution. Accordingly, it is possible to avoid finding, as a search result, unrobust analysis conditions under which even a slight change in a parameter value will worsen the analysis result or analytical-processing result. Consequently, the probability of correctly finding highly robust analysis conditions will be increased.

DESCRIPTION OF EMBODIMENTS

In the previously described modes of the method and program for assisting the development of an analysis procedure according to the present invention, typical examples of the "chromatograph device" include liquid chromatographs, gas chromatographs and supercritical fluid chromatographs.

When the chromatograph device is a liquid chromatograph, the "plurality of analysis conditions" may include the flow rate (flow velocity) of the mobile phase, temporal change of the mixture ratio of the mobile phases (in the case of the gradient elution), pH value of the mobile phase (or temporal change of the pH value), temperature of the column oven, and amount of sample injection. Understandably, the analysis conditions are not limited to these examples; they may include any condition that can affect the analysis result or analytical-processing result.

An example of the "analysis result obtained with a chromatograph device" is a signal intensity value. Examples of the "result of analytical processing based on the analysis result" include the number of peaks, resolution of the peaks and other values determined by a predetermined analytical processing including the peak detection on chromatogram data.

An example of the method and program for assisting the development of an analysis procedure according to the present invention is hereinafter described with reference to the attached drawings.

Figure 1:
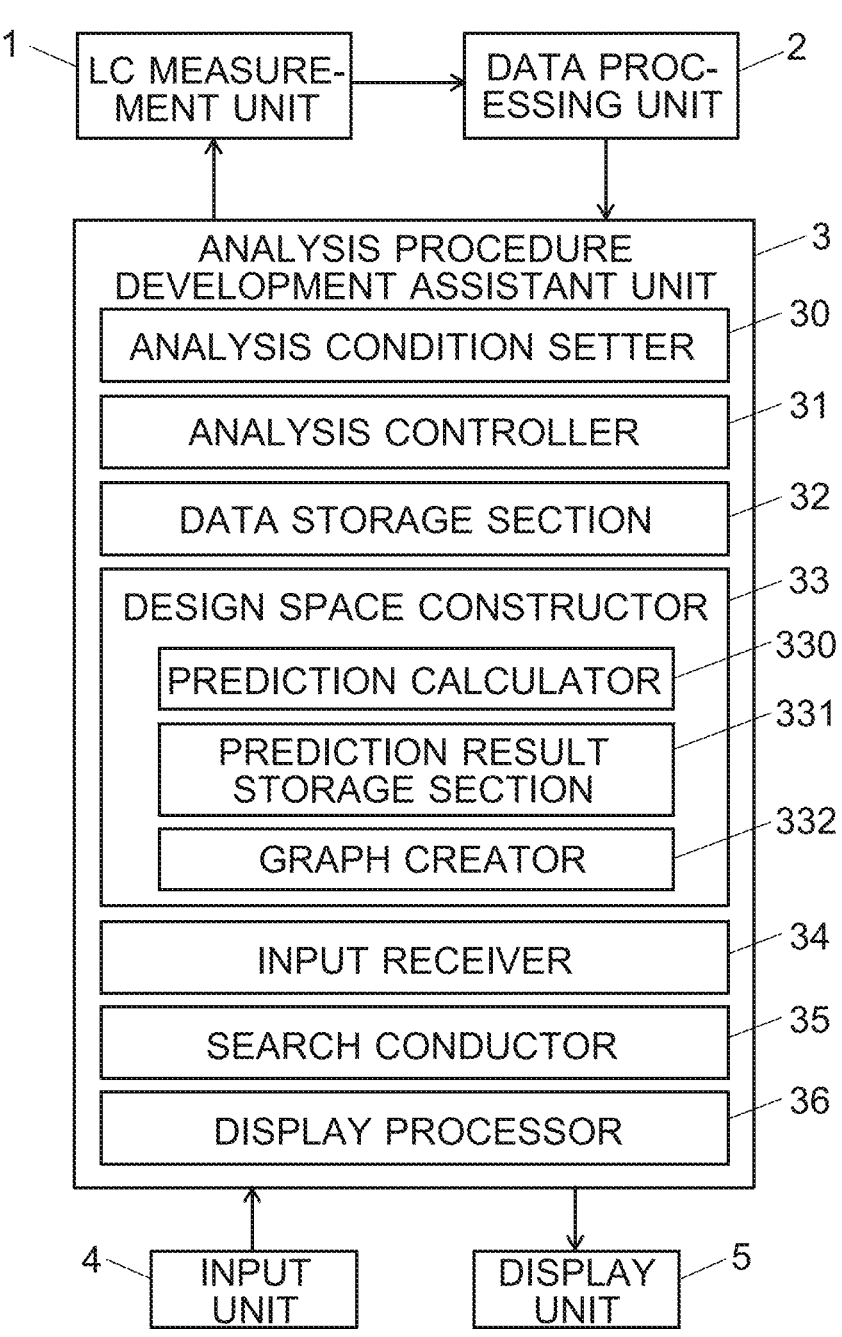
FIG. 1 is a schematic configuration diagram of one embodiment of an LC-analyzing system including a device for carrying out a method for assisting the development of an analysis procedure according to the present invention.

FIG. 1 is a schematic configuration diagram showing one embodiment of an LC-analyzing system including a device for carrying out a method for assisting the development of an analysis procedure according to the present invention.

The present LC system includes an LC measurement unit 1, data processing unit 2, analysis procedure development assistant unit 3, input unit 4 and display unit 5.

Though not shown, the LC measurement unit 1 includes a mobile phase container, one or more liquid-supply pumps for suctioning and supplying a mobile phase, an injector for injecting a sample into the mobile phase, a column for separating components (compounds) in the sample, a column oven in which the column is contained, a detector and other related devices. When necessary, it may also include a mixer for mixing a plurality of mobile phases. As for the detector, an optical detector may be used, such as a photodiode array detector or ultraviolet-visible spectrophotometric detector. A mass analyzer can also be used as the detector.

The data processing unit 2 receives detection signals from the detector in the LC measurement unit 1 and stores those signals in a digitized form. It also has the function of creating a chromatogram by performing a predetermined waveform processing on the collected data. The data processing unit 2 may also have the function of detecting a peak corresponding to a component in a sample in the chromatogram and identifying the component based on the retention time and other pieces of information related to the peak or determining the quantity of the component based on the area value of the peak.

The analysis procedure development assistant unit 3 includes, as its functional blocks, an analysis condition setter 30, analysis controller 31, data storage section 32, design space constructor 33, input receiver 34, search conductor 35 and display processor 36. This analysis procedure development assistant unit 3 is the central component for carrying out the method for assisting the development of an analysis procedure in the LC-analyzing system according to the present embodiment.

The data processing unit 2 and the analysis procedure development assistant unit 3 can be constructed using a personal computer, or a more sophisticated computer called a "workstation", as a hardware resource, with their respective functions realized by running, on the computer, dedicated software (computer program) installed on the same computer.

This computer program can be offered to users in the form of a non-transitory computer-readable record medium holding the program, such as a CD-ROM, DVD-ROM, memory card, or USB memory (dongle). The program may also be offered to users in the form of data transferred through the Internet or similar communication networks. The program can also be preinstalled on a computer (or more exactly, on a storage device as a component of a computer) as a part of a system before a user purchases the system.

Figure 2:
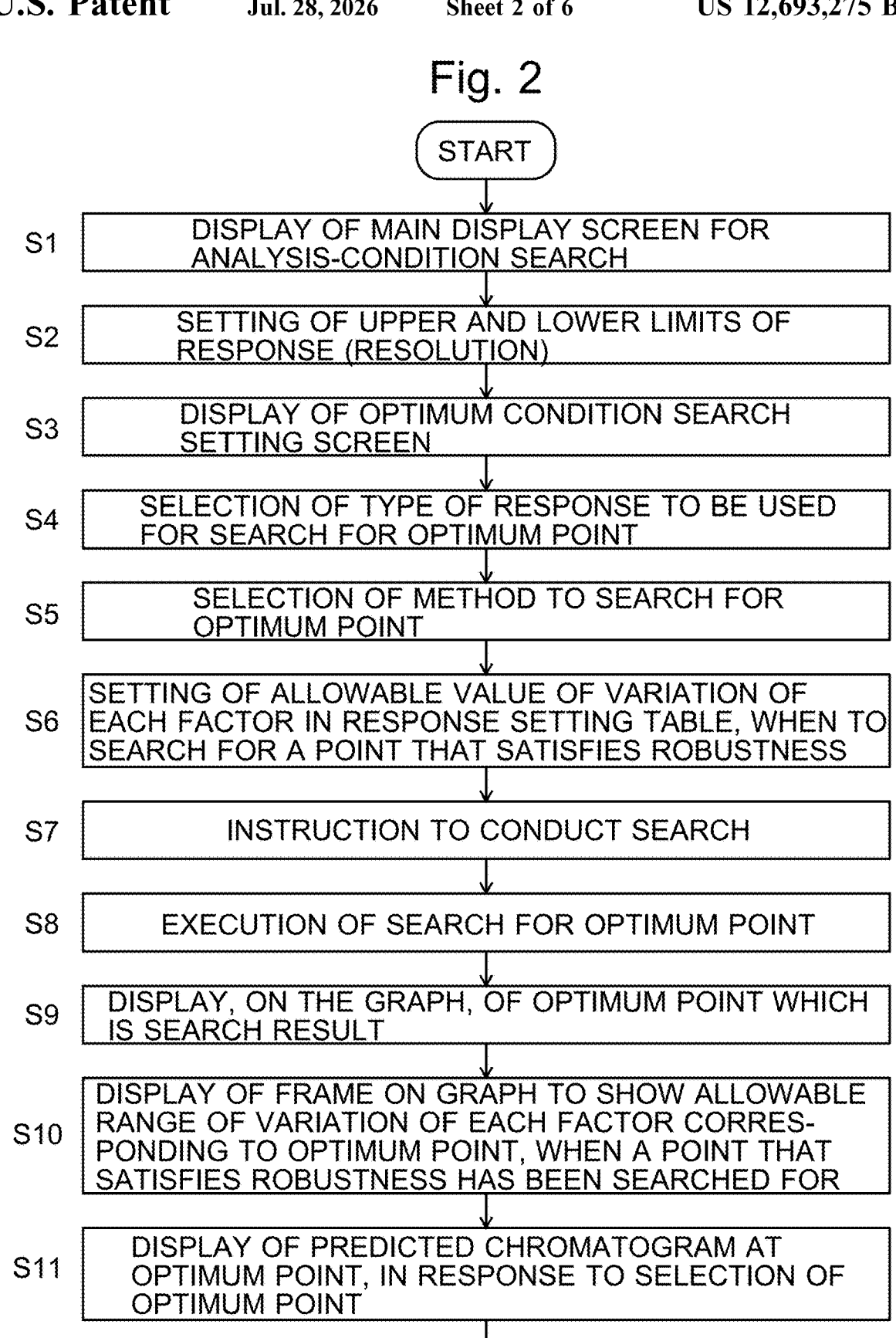
FIG. 2 is a flowchart showing a procedure of an analysis condition search in the LC-analyzing system according to the present embodiment.

The working procedure of the user and the operation of the present system in developing an analysis procedure, i.e., in searching for an appropriate combination of parameter values in a plurality of analysis conditions, in the LC-analyzing system according to the present embodiment are hereinafter described. FIG. 2 is a flowchart showing the flow of the procedure and processing in the analysis condition search.

Figure 8:
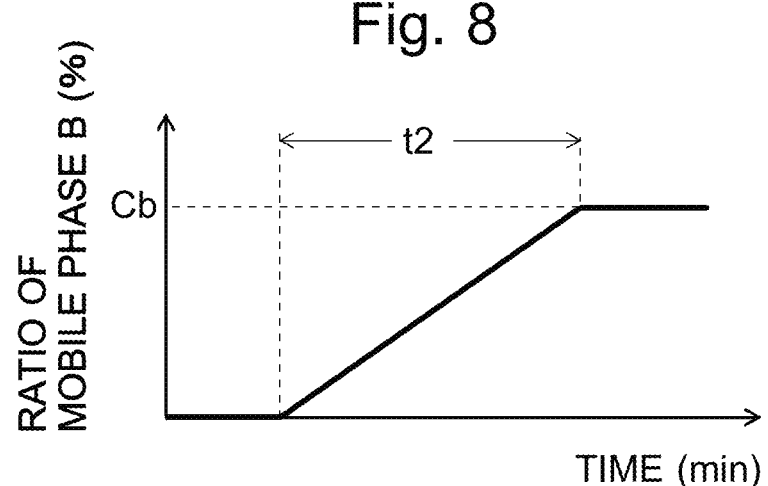
FIG. 8 is a graph showing an example of the time program in gradient elution.

Typical analysis conditions for an LC-analyzing system include the flow rate (flow velocity) of the mobile phase, temporal change of the mixture ratio of the mobile phases, temperature of the column oven, and amount of sample injection. In recent years, it has been common to perform gradient elution in an LC analysis. In that case, the temporal change (time program) of the mixture ratio of the mobile phases is important. As one example, it is hereinafter assumed that a time program in which the ratio of the mobile phase B is changed as shown in FIG. 8 is used for gradient elution using two mobile phases A and B. The parameter values to be optimized are the ultimate ratio Cb (%) of the mobile phase B and the period of time t2 (min) over which the ratio of the mobile phase B is changed.

Initially, for each of the plurality of analysis conditions, the user determines parameter values to be used in the actual measurement and enters those values from the input unit 4. The entered information is stored in the analysis condition setter 30. As an example, it is hereinafter assumed that the ratio Cb (%) of the mobile phase B has three selectable values of 25, 50 and 75, while the period of time t2 (min) has nine selectable values ranging from 20 to 60 (min) in steps of 5 minutes. Accordingly, there are 27 combinations of the parameter values to be used in the actual measurement. It is also assumed that the other parameter values in the analysis conditions are fixed at their respective predetermined values.

The analysis controller 31 sequentially changes the combination of the parameter values from one combination to another among the combinations stored in the analysis condition setter 30 and controls the LC measurement unit 1 to perform an LC analysis for the same sample using each combination of the parameter values. The data processing unit 2 processes the data acquired by each LC analysis, counts the number of all significant peaks observed in the chromatogram (e.g., all peaks whose peak intensities are equal to or higher than a predetermined threshold), and calculates the resolution of the peaks. The analysis result thus obtained in the data processing unit 2, including the chromatogram data, number of peaks, peak resolution and other related pieces of information, is sent to the analysis procedure development assistant unit 3 and stored in the data storage section 32. As noted earlier, there are 27 combinations of the two parameter values. The chromatogram data and analysis result are obtained for each of the 27 combinations and stored in the data storage section 32.

The resolution of the peaks can be calculated for each combination of the two peaks temporally neighboring each other in the chromatogram by a commonly known method described, for example, in Non Patent Literature 4. If there are three or more peaks observed in one chromatogram, a plurality of resolutions can be calculated. However, the numerical value actually required is the lowest resolution among the plurality of resolutions, i.e., the resolution of the two most unresolved peaks. Accordingly, it is practically possible to calculate only the lowest resolution for each chromatogram.

Subsequently, an prediction calculator 330 in the design space constructor 33 performs a regression analysis based on the chromatogram data corresponding to the specific combinations of the parameter values related to the two analysis conditions stored in the data storage section 32, to predict chromatograms corresponding to all possible combinations of the two parameter values (in practice, all discrete combinations of numerical values in predetermined steps). Furthermore, the prediction calculator 330 detects the peaks observed in the predicted chromatogram and calculates the analytical-processing result, such as the number of peaks and the peak resolution. The data which constitute the thus predicted chromatogram, as well as the results obtained by analytically processing the data, are stored in an prediction result storage section 331. Using the information stored in the prediction result storage section 331, a graph creator 332 creates a graph showing the relationship between the parameter values and the analytical-processing value as the graph to be displayed in the design space. In the LC-analyzing system according to the present embodiment, this graph may be, but is not limited to, a two-dimensional contour map, three-dimensional contour map or heat map.

It should be noted that the processing described so far, i.e., the prediction of the analytical-processing results corresponding to various combinations of the parameter values which have not been actually measured and the construction of a design space, based on analytical-processing results obtained by actual measurements under various combinations of the parameter values in a plurality of analysis conditions, can also be realized with an existing software product for assisting the development of an analysis procedure.

Figure 3:
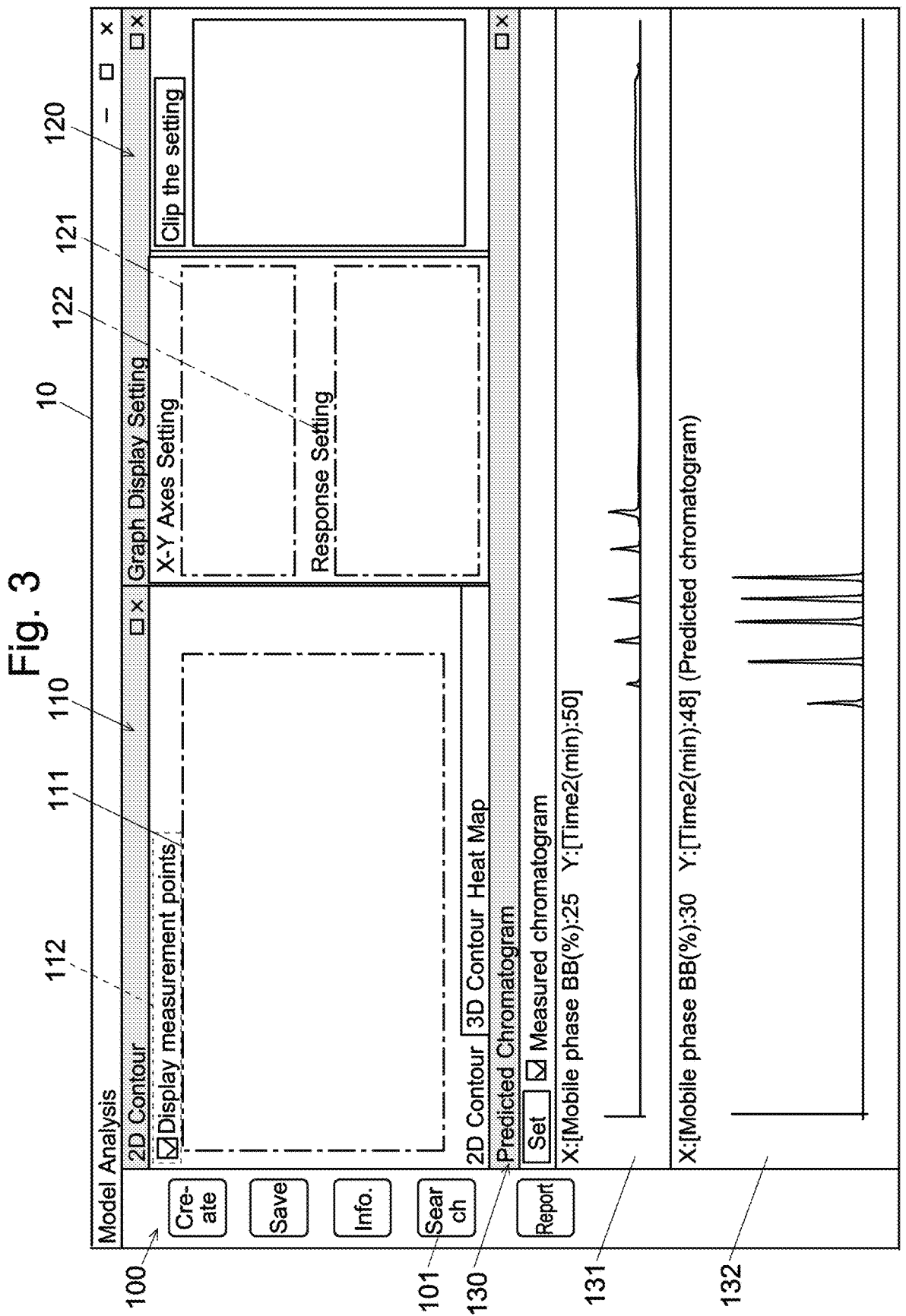
FIG. 3 is a diagram showing an example of a main display screen used in the analysis condition search in the LC-analyzing system according to the present embodiment.

When a predetermined operation with the input unit 4 has been performed by the user, the display processor 36 displays, on the display unit 5, a main display screen 10 as shown in FIG. 3 for the analysis condition search (Step S1). The main display screen 10 roughly consists of a button display area 100, graph display area 110, graph display setting area 120 and chromatogram display area 130 arranged as shown in FIG. 3.

In the button display area 100, a plurality of buttons to be clicked for performing various tasks are arranged. A "Search" button 101 is included in those buttons.

In the graph display area 110, a graph 111 which shows the relationship between the parameter values as the analysis conditions and the analytical-processing result (or analysis result) is displayed as the design space, which is selected from the two-dimensional contour map, three-dimensional contour map and heat map. The graph 111 in the present example is a two-dimensional contour map 111A. Details of this map will be described later.

Figure 5:
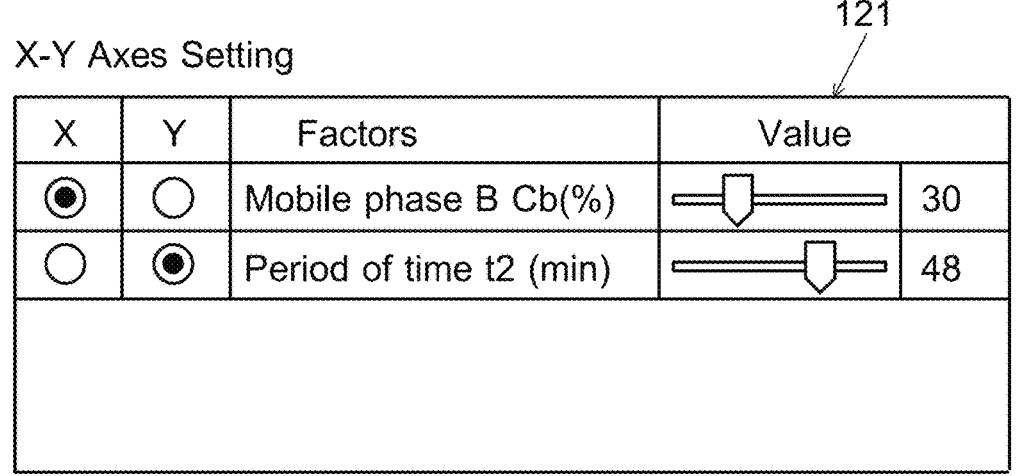
FIG. 5 is an example of an X-Y axes setting table displayed in a graph display setting area in FIG. 3.
Figures 6, 7:
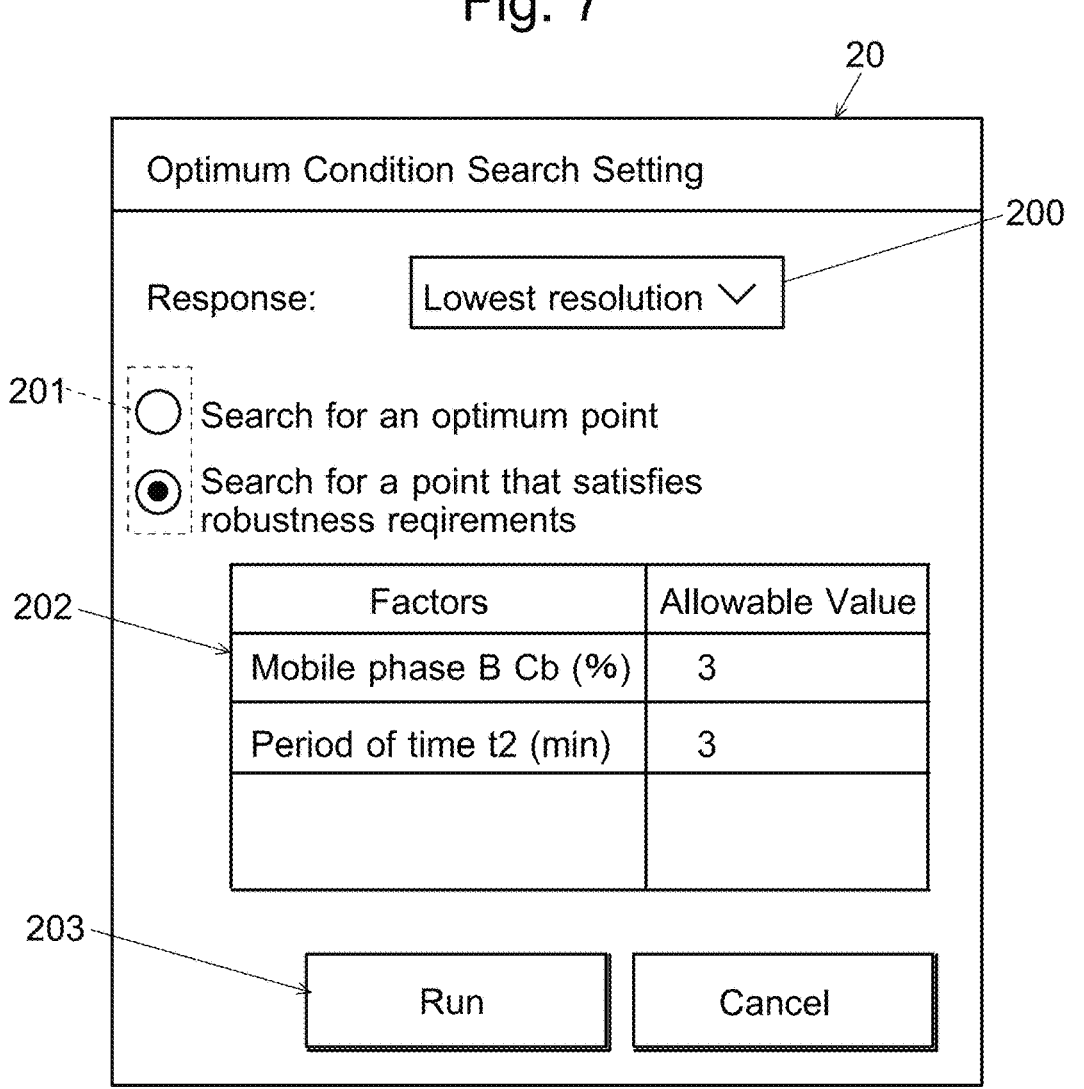
FIG. 6 is an example of a response setting table displayed in the graph display setting area in FIG. 3.
FIG. 7 is an example of an optimum condition search setting screen used in the analysis condition search in the LC-analyzing system according to the present embodiment.

The graph display setting area 120 includes an X-Y axes setting table 121 and a response setting table 122. In the present example, the X-Y axes setting table 121 is as shown in FIG. 5, while the response setting table 122 is as shown in FIG. 6. The X-Y axes setting table 121 is a table for setting the parameters (in FIG. 5, "Factors") corresponding to the X and Y axes of the graph 111 to be displayed in the graph display area 110. The response setting table 122 is a table for setting the kind of analytical-processing result (the data value represented by the height of the contour line on the contour map or by the color or grayscale value on the heat map) corresponding to each point on the graph 111 to be displayed in the graph display area 110 as well as the allowable range of the numerical value of the analytical-processing result.

In the chromatogram display area 130, a chromatogram corresponding to a specific point on the graph 111 is displayed. If this specific point is not an actual measurement point, a chromatogram predicted by the regression analysis in the previously described manner is displayed. A measured chromatogram obtained at the closest actual measurement point to the specific point concerned can also be displayed along with the predicted chromatogram. In FIG. 3, a measured chromatogram and a predicted chromatogram are displayed in a vertically arranged form. It should be noted that the scales of the horizontal and vertical axes of the chromatograms are omitted in FIG. 3 in order to avoid too much complication of the drawing.

The X-Y axes setting table 121 in the graph display setting area 120 shows the kinds of parameters previously set as the target for the optimization, i.e., the kinds of parameter values each of which was gradually changed to a plurality of values in the actual measurement. In the present example, there are only two parameters to be optimized, i.e., the ratio Cb of the mobile phase B and the period of time t2. Therefore, only the two parameter values are shown in the X-Y axes setting table 121 in FIG. 5. When there are more parameters to be optimized, the number of factors displayed in the X-Y axes setting table 121 will be increased accordingly. The user can appropriately determine the X and Y axes of the graph 111 by turning on or off the radio buttons in the X-Y axes setting table 121 by a clicking operation. The kind of response in the graph 111 can be indicated by checking the appropriate box 1220 in the response setting table 122.

Figure 4:
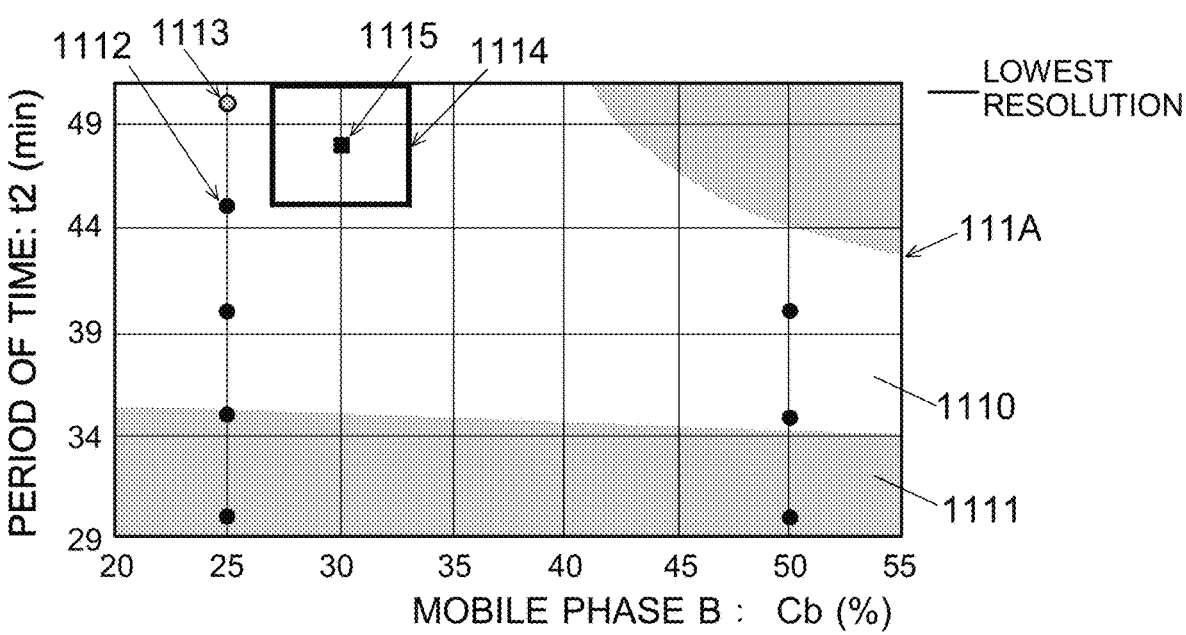
FIG. 4 is an example of a graph (two-dimensional contour map) displayed in a graph display area in FIG. 3.

When the settings are as shown in FIGS. 5 and 6, the two-dimensional contour map 111A displayed in the graph display area 110 shows the ratio Cb of the mobile phase B as the X axis, the period of time t2 as the Y axis, and the lowest resolution as the response. In FIG. 4, the points 1112 and 1113 are actual measurement points; i.e., each of these points corresponds to a combination of actually measured parameter values. It should be noted that the contour lines are omitted in FIG. 4. The marks denoted by reference signs 1114 and 1115 are not displayed before a search for the optimum condition has been conducted.

The user enters and sets the upper and lower limits of the response in the response setting table 122 (Step S2). The range determined by the upper and lower limits is the constraint condition of the response under which the search for the optimum condition should be conducted. Both of the upper and lower limits are entered in the present example. It is also possible to allow for the entry of only one of them and conduct the search under the constraint condition that the response should be equal to or greater than the lower limit, or equal to or lower than the upper limit.

Subsequently, the user clicks the "Search" button 101. Upon receiving this operation, the input receiver 34 superposes, on the main display screen 10, an optimum condition search setting screen 20 as shown in FIG. 7. The optimum condition search setting screen 20 is a screen for specifying search conditions to search for optimum analysis conditions.

A search response selector 200 in the optimum condition search setting screen 20 allows the user to select the kind of response for which the optimum point should be located. The kinds of selectable responses are displayed in the dropdown menu. Specifically, one of the following kinds of responses can be selected in the present example:

Lowest resolution of all peaks in the chromatogram.
Resolution of a specific compound in the chromatogram.
Resolution among a plurality of specific compounds (e.g., between compounds A and B) in the chromatogram.
Number of peaks detected in the chromatogram.
An index calculated from the number of peaks detected in the chromatogram and the resolution of those peaks.

A search method selector 201 allows the user to select the method for the search for the optimum point from the following two options:

"Search for an optimum point", to search for the point (i.e., the combination of the parameter values) at which the response value is highest within the range of response values between the upper and lower limits specified in the response setting table 122, and
"Search for a point that satisfies robustness requirements", to search for a point at which the response is the highest among a list of points at each of which the variation of the response value falls within the range between the upper and lower limits of the response, on the assumption that each of the specified factors (analysis conditions) varies by the amount set in the "allowable value" field in an allowable value setting table 202.

By operating the input unit 4, the user selects the kind of response and the search method described earlier, and when the "Search for a point that satisfies robustness requirements" option is selected, the user should also set the allowable value of the variation of each factor in the allowable value setting table 202 (Steps S4, S5 and S6). After these operations, the user clicks the "Run" button 203, and the input receiver 34 receives this clicking operation (Step S7). In response to this, the search conductor 35 conducts the search for an optimum point under the set constraint condition as well as the search conditions (Step S8).

In the example shown in FIGS. 6 and 7, the search is specifically performed as follows.

It is hereinafter assumed that the constraint condition on the response is that the lowest resolution on the graph 111 should be within a range of 7-9. In the example of FIG. 4, the non-shaded area denoted by reference sign 1110 on the graph 111 is the area where the lowest resolution is within the range of 7-9. The shaded area denoted by reference sign 1111 is the area where the lowest resolution is not within the range of 7-9.

Under the constraint condition (the lowest resolution being within the range of 7-9), the point where the lowest resolution is maximized is searched for under the conditions that the range of the variation of the ratio Cb of the mobile phase B is 3 and that of the variation of the period of time t2 is also 3. For a given point on the graph 111, the "robustness check range", i.e., the range within which the two factors can vary, is represented by a rectangle centered at the point concerned. The search conductor 35 gradually shifts the robustness check range in the directions of the X and Y axes on the graph 111 in such a manner that the robustness check range is always entirely included within the non-shaded area 1110, as required by the aforementioned constraint condition. At each different position of the robustness check range, the search conductor 35 calculates the lowest resolution at the central point, to search for the point where the lowest resolution is maximized (under the condition that the lowest resolution should be within the range of 7-9). The point thus located is a point where the response will always fall within the range between the upper and lower limits even when the two factors vary within the robustness check range, as well as a point where the response is highest.

When the selected search method is not the "Search for a point that satisfies robustness requirements" but the "Search for an optimum point", the search conductor 35 does not use the robustness check range and simply searches for the point where the response is highest among the points within the non-shaded area 1110 on the graph 111.

After the search for the optimum point has been completed, the display processor 36 displays the thereby located optimum point on the graph 111 (Step S9). In FIG. 4, the optimum point 1115 is represented by a rectangular point while the actual measurement points 1112 and 1113 are represented by circular points so that the optimum point 1115 can be visually distinguished from the actual measurement points 1112 and 1113. When the "Search for a point that satisfies robustness requirements" has been conducted, a rectangular frame 1114 showing the robustness check range for the optimum point 1115 is displayed on the graph 111 (Step S10). Furthermore, the display processor 36 alters the display mode of the actual measurement point 1113 closest to the optimum point 1115 on the graph 111 to make it distinguishable from the other actual measurement points 1112. In the present example, the display color of the actual measurement point is altered while its shape is unchanged. The method of alteration is not limited to this example.

The optimum point 1115 on the graph 111 is in the selectable state. The user indicates this optimum point 1115 by operating the input unit 4. Then, the display processor 36 reads the data of the predicted chromatogram corresponding to the optimum point 1115 from the prediction result storage section 331 and displays the predicted chromatogram in the chromatogram display area 130 (Step S11). If the box for the setting of the display of the measured chromatogram is checked as shown in FIG. 3, the display processor 36 additionally retrieves the data of the measured chromatogram corresponding to the actual measurement point 1113 closest to the optimum point 1115 and displays that measured chromatogram in the chromatogram display area 130.

Thus, the LC-analyzing system according to the present embodiment constructs the design space based on the results of actual measurements. On this design space, the user can conveniently recognize the combination of the optimum parameter values that satisfy the conditions set by the user. The user can also view a chromatogram predicted under those optimum parameter values. This helps the user to efficiently develop an LC-analysis procedure that matches the purpose of the analysis.

In the previous descriptions, the response in the design space is the lowest resolution. Other types of response can also be used to search for the optimum point, as described earlier. As for the use of the "resolution of a specific compound" or "resolution among a plurality of specific compounds" as the response, it should be noted that no predicted value is calculated for these types of resolution during the construction of the design space. Therefore, when any of these types of resolution is selected as the response to be used for the search, the predicted value should be calculated from the predicted chromatogram when the search is conducted. The selection of the specific compound (or compounds) is made on a separate setting screen. As a possible example, after the compounds corresponding to the peaks observed in the measured chromatogram have been individually identified, a compound table listing the identified compounds may be created so that the user can specify a specific compound (or compounds) on this table.

The descriptions thus far have been concerned with an application of the present invention in liquid chromatography (LC analysis). It is evident that the present invention is applicable in chromatographic analyses in general, such as gas chromatography or supercritical fluid chromatography, in which chromatograms can be created as in the liquid chromatography. Needless to say, the analysis conditions to be optimized will change depending on the type of chromatography.

Any of the previously described embodiment and its variations is a mere example of the present invention and will naturally fall within the scope of claims of the present application even when an appropriate change, modification or addition is made within the gist of the present invention.

Various Modes

It is evident to a person skilled in the art that the previously described illustrative embodiment is a specific example of the following modes of the present invention.

(Clause 1) One mode of the method for assisting the development of an analysis procedure according to the present invention is a method for assisting the development of an analysis procedure, in which an analysis result obtained with a chromatograph device is used to assist the task of determining a combination of respective parameter values of a plurality of analysis conditions suitable for an intended analysis, the method including:

a graph-displaying step for displaying, on a screen of a display section, a graph created based on data collected with a chromatograph device, the graph showing a relationship between the parameter values of the plurality of analysis conditions and an analysis result obtained with the chromatograph device or a result of analytical processing based on the analysis result;

an input-receiving step for receiving an input, by a user, of a constraint condition which specifies the upper limit, the lower limit or the range of a numerical value representing the analysis result or the result of the analytical processing;

a search-conducting step for conducting a search for a combination of the parameter values of the plurality of analysis conditions, the combination yielding the analysis result or the result of the analytical processing in which the numerical value satisfies a previously determined search condition under the received constraint condition; and a search-result-displaying step for displaying, on the graph, a search result obtained by the search-conducting step.

(Clause 7) One mode of the program for assisting the development of an analysis procedure according to the present invention is a program for assisting the development of an analysis procedure, in which an analysis result obtained with a chromatograph device is used to assist the task of determining a combination of respective parameter values of a plurality of analysis conditions suitable for an intended analysis, the program configured to make a computer operate as:

a graph-displaying functional section configured to display, on a screen of a display section, a graph created based on data collected with a chromatograph device, the graph showing a relationship between the parameter values of the plurality of analysis conditions and an analysis result obtained with the chromatograph device or a result of analytical processing based on the analysis result;

an input-receiving functional section configured to receive an input, by a user, of a constraint condition which specifies the upper limit, the lower limit or the range of a numerical value representing the analysis result or the result of the analytical processing;

a search-conducting functional section configured to conduct a search for a combination of the parameter values of the plurality of analysis conditions, the combination yielding the analysis result or the result of the analytical processing in which the numerical value satisfies a previously determined search condition under the received constraint condition; and a search-result-displaying functional section configured to display, on the graph, a search result obtained by the search-conducting functional section.

According to the previously described modes of the present invention, the user only needs to specify the range, upper limit or lower limit of a numerical value representing an analysis result or a result of analytical processing which the user considers to be appropriate. Based on the input by the user, analysis conditions which are the most appropriate or considerably close to the most appropriate are presented to the user. This reduces the workload of the user in developing an analysis procedure for a chromatographic analysis such as an LC or GC analysis. Appropriate analysis conditions can be efficiently determined without relying on the ability, experience, skill and other personal factors of the individual who performs the task.

In the method described in Clause 1 and the program described in Clause 7, the result of the automatic search is displayed on a graph, which allows the user to visually recognize, for example, whether or not the search result is a local optimum solution. Accordingly, it is possible to avoid finding, as a search result, unrobust analysis conditions under which even a slight change in a parameter value will worsen the analysis result or analytical-processing result. Consequently, the probability of correctly finding highly robust analysis conditions will be increased.

(Clause 2) In the method for assisting the development of an analysis procedure described in Clause 1, the search condition may be that the numerical value representing the analysis result or the result of the analytical processing should be largest under the constraint condition.

(Clause 8) In the program for assisting the development of an analysis procedure described in Clause 7, the search condition may be that the numerical value representing the analysis result or the result of the analytical processing should be largest under the constraint condition.

With the method described in Clause 2 and the program described in Clause 8, it is possible to conveniently find an analysis condition under which the numerical value representing the analysis result or the result of the analytical processing becomes largest under a user-inputted constraint on the numerical value.

(Clause 3) In the method for assisting the development of an analysis procedure described in Clause 1, the input-receiving step may further include receiving an input, by a user, of an allowable width for each of the parameter values of the plurality of analysis conditions, and the search-conducting step may include searching for a combination of the parameter values of the plurality of analysis conditions within a search range of the parameter values of the plurality of analysis conditions within which the numerical value representing the analysis result or the result of analytical processing satisfies the constraint condition even when the parameter values of the plurality of analysis conditions are varied by the respective allowable widths.

(Clause 4) In the method for assisting the development of an analysis procedure described in Clause 3, the search condition may be that the numerical value representing the analysis result or the result of the analytical processing should be largest within the search range.

(Clause 9) Similarly, in the program for assisting the development of an analysis procedure described in Clause 7, the input-receiving functional section may be configured to receive an input, by a user, of an allowable width for each of the parameter values of the plurality of analysis conditions, and the search-conducting functional section may be configured to search for a combination of the parameter values of the plurality of analysis conditions within a search range of the parameter values of the plurality of analysis conditions within which the numerical value representing the analysis result or the result of analytical processing satisfies the constraint condition even when the parameter values of the plurality of analysis conditions are varied by the respective allowable widths.

(Clause 10) In the program for assisting the development of an analysis procedure described in Clause 9, the search condition may be that the numerical value representing the analysis result or the result of the analytical processing should be largest within the search range.

With the methods described in Clauses 3 and 4 as well as the programs described in Clauses 9 and 10, it is possible to correctly and conveniently find a combination of the appropriate parameter values which ensure a desired level of performance even when the parameter values of the analysis conditions are varied, i.e., a combination of the parameter values having a high level of robustness.

(Clause 5) The method for assisting the development of an analysis procedure described in one of Clauses 1-4 may further include a chromatogram-displaying step for displaying a measured chromatogram or a predicted chromatogram corresponding to a combination of the parameter values of the plurality of analysis conditions at an arbitrary position on the graph.

(Clause 11) Similarly, the program for assisting the development of an analysis procedure described in one of Clauses 7-10 may be further configured to make the computer operate as a chromatogram-displaying functional section configured to display a measured chromatogram or a predicted chromatogram corresponding to a combination of the parameter values of the plurality of analysis conditions at an arbitrary position on the graph.

With the method described in Clause 5 and the program described in Clause 11, the user can visually check a chromatogram for any possible combination of the parameter values related to the analysis conditions which should be optimized.

(Clause 6) In the method for assisting the development of an analysis procedure described in Clause 5, the chromatogram-displaying step may further include displaying a measured chromatogram or a predicted chromatogram corresponding to the search result obtained by the search-conducting step.

(Clause 12) Similarly, in the program for assisting the development of an analysis procedure described in Clause 11, the chromatogram-displaying functional section may further be configured to display a measured chromatogram or a predicted chromatogram corresponding to the search result obtained by the search-conducting functional section.

With the method described in Clause 6 and the program described in Clause 12, the user can visually check a chromatogram under a combination of the parameter values which have been identified as optimum. Therefore, for example, the user can check, on the graph, whether or not the peaks are satisfactorily separated.

REFERENCE SIGNS LIST

1 . . . LC Measurement Unit
2 . . . Data Processing Unit
3 . . . Analysis Procedure Development Assistant Unit
30 . . . Analysis Condition Setter
31 . . . Analysis Controller
32 . . . Data Storage Section
33 . . . Design Space Constructor
330 . . . Prediction Calculator
331 . . . Prediction Result Storage Section
332 . . . Graph Creator
34 . . . Input Receiver

14

35 . . . Search Conductor
36 . . . Display Processor
4 . . . Input Unit
5 . . . Display Unit

The invention claimed is:

1. A method performed by a computer for assisting the development of an analysis procedure, in which an analysis result obtained with a chromatograph device is used to assist a task of determining a combination of a first parameter and a second parameter included in an analysis condition suitable for an intended analysis, the method comprising:

preparing a plurality of analysis conditions each including a value of the first parameter and a value of the second parameter, and a plurality of chromatogram data each of which corresponds to one of the plurality of analysis conditions, wherein the value of the first parameter is different between at least two of the plurality of analysis conditions and the value of the second parameter is different between at least two of the plurality of analysis conditions;

obtaining, as a result value of a processing result, a number of peaks or a resolution of the peaks for each of the plurality of chromatogram data, displaying, on a screen of a display, a graph showing a relationship between the first parameter, the second parameter, and the processing result;

receiving an input, by a user, of a constraint condition which specifies an upper limit, a lower limit or a range of a numerical value with respect to the processing result;

searching and determining a target combination of a first target value of the first parameter and a second target value of the second parameter such that an estimated processing result value for the target combination based on the relationship satisfies the constraint condition; and displaying the determined target combination on the graph displayed on the screen.

2. The method for assisting the development of an analysis procedure according to claim 1, wherein a search condition is previously determined such that the processing result value should be largest under the constraint condition.

3. The method for assisting the development of an analysis procedure according to claim 1, further comprising:

receiving a further input, by the user, of an allowable width for each of the first parameter and the second parameter; and searching the target combination within a search range in which the estimated processing result value satisfies the constraint condition even when the target value of the first parameter and/or the target value of the second parameter are varied by the respective allowable widths.

4. The method for assisting the development of an analysis procedure according to claim 3, wherein the search condition is that the processing result value should be largest within the search range.

5. The method for assisting the development of an analysis procedure according to claim 1, further comprising:

displaying, upon an input of a specified combination of a specified value of the first parameter and a specified value of the second parameter at an arbitrary position on the graph, a measured chromatogram or a predicted chromatogram corresponding to the specified combination.

6. The method for assisting the development of an analysis procedure according to claim 5, further comprising displaying a measured chromatogram or a predicted chromatogram corresponding to the target combination.

7. The method for assisting the development of an analysis procedure according to claim 1, wherein a graph having axes which corresponds to the first parameter and the second parameter is created.

8. A non-transitory computer readable medium recording a program for assisting the development of an analysis procedure, in which an analysis result obtained with a chromatograph device is used to assist a task of determining a combination of a first parameter and a second parameter included in an analysis condition suitable for an intended analysis, the program configured to make a computer perform operations of:

preparing a plurality of analysis conditions each including a value of the first parameter and a value of the second parameter, and a plurality of chromatogram data each of which corresponds to one of the plurality of analysis conditions, wherein the value of the first parameter is different between at least two of the plurality of analysis conditions and the value of the second parameter is different between at least two of the plurality of analysis conditions:

obtaining, as a result value of a processing result, a number of peaks or a resolution of the peaks for each of the plurality of chromatogram data;

displaying, on a screen of a display, a graph showing a relationship between the first parameter, the second parameter, and the processing result;

receiving an input, by a user, of a constraint condition which specifies an upper limit, a lower limit or a range of a numerical value with respect to the processing result;

searching and determining a target combination of a first target value of the first parameter and a second target value of the second parameter such that an estimated processing result value for the target combination based on the relationship satisfies the constraint condition; and displaying the determined target combination on the graph displayed on the screen.

9. The non-transitory computer readable medium recording a program for assisting the development of an analysis procedure according to claim 8, wherein a search condition is previously determined such that the numerical value representing the processing result value should be largest under the constraint condition.

10. The non-transitory computer readable medium recording a program for assisting the development of an analysis procedure according to claim 8, wherein the program is further configured to make the computer perform operations of:

receiving an input, by the user, of an allowable width for each of the first parameter and the second parameter; and searching the target combination within a search range in which the estimated processing result value satisfies the constraint condition even when the target value of the first parameter and/or the target value of the second parameter are varied by the respective allowable widths.

11. The non-transitory computer readable medium recording a program for assisting the development of an analysis procedure according to claim 10, wherein the search condition is that the processing result value should be largest within the search range.

12. The non-transitory computer readable medium recording a program for assisting the development of an analysis procedure according to claim 8, wherein the program is further configured to make the computer perform an operation of:

displaying, upon an input of a specified combination of a specified value of the first parameter and a specified value of the second parameter at an arbitrary position on the graph, a measured chromatogram or a predicted chromatogram corresponding to the specified combination.

13. The non-transitory computer readable medium recording a program for assisting the development of an analysis procedure according to claim 8, wherein the program is further configured to make the computer perform an operation of:

displaying a measured chromatogram or a predicted chromatogram corresponding to the target combination.

14. The non-transitory computer readable medium recording a program for assisting the development of an analysis procedure according to claim 8, wherein the program is further configured to make the computer perform an operation of:

creating a graph having axes which corresponds to the first parameter and the second parameter.

* * * * *